# 2,772,168

FERMENTABLE CARBOHYDRATE FOOD PRODUCTS

William James King, River Edge, N. J., assignor to Colgate-Palmolive Company, a corporation of Delaware No Drawing. Application November 28, 1951,
Serial No. 258,759

27 Claims. (Cl. 99—28)

The present invention relates to new and improved food products and, more particularly, to fermentable carbohydrate food products having incorporated therein certain higher amides of amino acids which have the property of inhibiting or minimizing acid production from said fermentable carbohydrate, as hereinafter described and claimed.

It is recognized that there are numerous and complex variables which are of consideration in the etiology and control of dental caries. Among the myriad of factors of consideration has been the rate of acid formation and/or neutralization in the mouth; type of diet; character of enamel and saliva; presence of bacteria; oral hygiene, etc. It is generally accepted that the decalcification of tooth enamel and the like characteristic of dental caries is caused to a large extent by the acids produced from the fermentation of suitable carbohydrates in the oral cavity by the action of certain micro-organisms normally present therein. In general, one means of inhibiting such tooth decay is by appropriate restriction of the diet, particularly the intake of various sugars, starches, etc., and much evidence has been accumulated in favor thereof. Such foods however are also required for proper body metabolism and other desirable effects and therefore any substantial restriction should be compensated for by other adjustments in the diet such as to maintain the proper caloric intake, etc. As a practical matter, moreover, it is not feasible to modify or change the dietary habits of the public as a whole in order to alter or control the carbohydrate content of the diet. It is of vital consideration therefore that some means be discovered whereby the harmful effects of sugars and the like may be inhibited or deactivated or otherwise compensated for with the ultimate desirable effects of inhibition to some degree of dental caries.

In general, various chemical preservatives have been added to certain foods according to their known use or action, namely, as antiseptics, germicides, antioxidants, etc. It is common, for example, to use inorganic preservatives such as nitrates, sulphites, and organic preservatives such as benzoates, formaldehyde, etc. to preserve or stabilize the food against molds, bacterial growth, rancidity, etc. It has also been suggested that various vitamins or drug-type anti-biotic agents broadly may also be incorporated in certain foods.

The problem of incorporation of a suitable preserving substance or like ingredient in a food preparation requires further consideration of the factors that such added ingredient must possess certain requisite supplementary characteristics such as satisfactory results from the viewpoint of acute oral toxicity, acute chromic toxicity, non-sensitization, non-irritation of the mucous membranes, etc. It is also requisite that it be compatible and supplementary with such foods; stable and active both in the formulation and to reasonably adverse conditions, etc. It is thus evident that a food preparation of the character further described herein is usually a specialty problem.

It has now been discovered that the development of acid in the oral cavity produced by the action of certain bacteria fermenting suitable carbohydrates in situ may be inhibited by the simultaneous presence of a higher amide of an amino carboxylic compound. The present invention thus comprises a fermentable carbohydrate susceptible to degradation with the production of acid by micro-organisms normally found in the oral cavity, such as lactobacilli, and as a preservative or inhibitor therefor an N-higher acyl amino carboxylic compound. It further relates to a food preparation comprising a fermentable carbohydrate food and having incorporated therein a minor amount of a higher fatty acid amide of an amino carboxylic acid or its water-soluble salts to inhibit acid production from said fermentable carbohydrate in the oral cavity. In a preferred embodiment, the present invention also comprises a food preparation having an added refined sweet fermentable sugar content, and a minor amount of an organic compound having the formula:

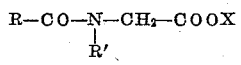

wherein RCO— is a higher fatty acyl radical of about 12 to 16 carbon atoms, R' is selected from the group consisting of hydrogen and lower alkyl, and X is selected from the group consisting of hydrogen and water soluble salt-forming cations, such as the lauroyl, myristoyl, and palmitoyl amides of sarcosine, glycine, and their water-soluble salts and the like.

The suitable active ingredients are generally the higher aliphatic amides of lower aliphatic amino carboxylic acid compounds, such as the higher fatty acid amides of the same. Optimum results are achieved with the saturated derivatives usually, particularly those having saturated fatty acyl radicals of about 12 to about 16 carbon atoms, e. g., dodecanoyl, tetradecanoyl, hexadecanoyl, etc., though other fatty acyl radicals such as decanoyl, stearoyl and oleoyl may also be used. The lower amino acid moiety of these compounds is generally derived from the lower aliphatic saturated amino carboxylic acids, such as, for example, those having up to about 6 carbons, usually the monocarboxylic acid derivatives. It is preferred that the compounds be derived from the amino substituted lower alkane carboxylic acids, such as the monoamino substituted alkane monocarboxylic acids, particularly the alpha amino substituted acids. Suitable amino acids from which the amides may be derived are aminoethanoic acid (glycine), methylaminoethanoic acid (sarcosine), 2-aminopropanoic acid (alanine), 3-aminopropanoic acid, valine, glutamic acid, etc. It is preferred to use the amides of those acids having about 2 to about 5 carbon atoms, and more particularly, the sarcoside and glycide derivatives and their homologues having up to about 5 carbon atoms in the amino acid portion of the molecule in view of the excellent results obtained by their use.

Such amides of amino carboxylic acid compounds are generally employed in the form of their free acids or preferably as the water-soluble salts thereof. In general, the desired salts are the water-soluble carboxylate salts such as the alkali metal (e.g., sodium, potassium, etc.), ammonium, amine, alkylolamine (e. g., mono-, di-, tri-ethanolamine), etc. Illustratively, suitable active ingredients are sodium N-lauroyl sarcoside, potassium N-lauroyl sarcoside, sodium N-myristoyl sarcoside, sodium N-palmitoyl sarcoside, sodium N-lauroyl glycide, potassium N-lauroyl glycide, sodium N-myristoyl glycide, lauroyl sarcosine, myristoyl sarcosine, lauroyl glycine, myristoyl glycine, ammonium N-lauroyl sarcoside, monoethanolamine N-lauroyl sarcoside, sodium N-lauroyl glutamate, sodium N-stearoyl sarcoside, sodium N-stearoyl glutamate, sodium N-decanoyl sarcoside, and suitable mixtures thereof, etc.

The inhibitory effect of these agents on a fermentable carbohydrate may be illustrated by certain in vitro tests for the measurement of acid production, such tests offering a high degree of correlation with in vivo results. Thus, a dextrose agar culture medium adjusted to a pH of about 4.8–5.0 and containing a suitable color indicator, brom-cresol-green, may be inoculated with caries-active saliva. Ordinarily, a tube of such inoculated medium will turn from a green to a yellow color within 24 hours as a result of increased acidity therein, such color change generally occurring over the pH range of about 4.4 to 4.1. It is characteristic of the active ingredients of the present invention that the addition of such substances in varying minor amounts to such media which have been inoculated with the saliva maintain a predominantly green color for even as long as 72 hours incubation at 37° C., thereby indicative of an inhibition of normal acid production.

Certain of these amides are further characterized by their capability for adsorption by proteinaceous material. This property is highly significant since it may provide a means, such as possible adsorption on the mucin plaque within the oral cavity, whereby the active ingredient is retained therein for prolonged effectiveness. The indicated protein adsorption characteristic may be illustrated and readily determined by a similar test procedure using a dilute solution of the inhibitor to treat casein (or substantially equivalent protein material such as mucin), washing and drying the treated casein and adding the same to a medium inoculated with caries-active saliva as previously described. The retention of a predominantly green color in the medium after a suitable period such as 72 hours also is indicative of the adsorption of the inhibitor by the protein and its subsequent activity in the inoculated medium. The term "adsorption" is used herein illustratively as denoting the penetration and/or retention of these active ingredients since the specific mechanism, whether adsorption, absorption or some other physical and/or chemical action appears to be highly complex in nature. While the invention is not limited to any particular theory, it is believed that the dual function of inhibiting acid production in situ from suitable carbohydrates fermented by caries-active saliva combined with adsorption by proteinaceous material results in optimum effects.

Such adsorption action or effect appears to be highly specific in nature, and in general characteristic of those active ingredients having fatty acyl radicals of about 12 to about 16 carbon atoms usually. The criticality of such results is not completely understood at this time. Such amides of the amino acids per se and their alkali metal salts such as the sodium and potassium derivatives exhibit optimum effectiveness generally whereas the ammonium salt, for example, is less active in the adsorption procedure though it has a pronounced effectiveness. In general, optimum effects appear with the lauroyl derivatives though, as indicated, other higher fatty acyl derivatives are also active in the relationship set forth.

Further extensive research relative to these active materials discloses that they are non-toxic in normal use. The active ingredients have extremely low acute and chronic toxicity values, and exhibit no apparent sensitization of the subjects or irritation of the mucous membranes.

Accordingly, these active ingredients may be incorporated in the food in any suitable amount. It is of course understood that such amount will be variable to some extent, dependent on the specific type of food product, the nature and quantity of sugar or the like present therein, etc., the desired taste or flavor and other personal considerations, etc. In general, these active ingredients will be effective in minor proportion in the products. While amounts of the order of up to about 5% and the like may be employed, a suitably effective amount up to about a few percent will usually be sufficient and preferably up to about three, e. g., from about .01–3%. It has been further determined that amounts not substantially in excess of about 1% are highly effective and are to be preferred usually since substantially greater amounts do not yield proportionately improved results generally.

The additives of the present invention may be incorporated with the food product, or suitable constituent thereof, at any stage during the manufacture, or use by the ultimate consumer, although it is preferred to incorporate them at the commercial stage of manufacture of the product so that the active ingredient and suitable food ingredients may be sold to the consumer as a unitary composition for eventual consumption in accordance with usual practice. Thus, the additives may be incorporated at any point during the manufacturing process at which subsequent operations will not substantially adversely modify the desired properties of the food compositions.

The fermentable carbohydrates which tend to develop acid production in the oral cavity are well known in the art. The invention is therefore applicable to mono-, di-, and polysaccharide products. Examples thereof are such mono-saccharides as glucose or dextrose, levulose or fructose; di-saccharides such as sucrose (commonly known as sugar) and maltose; and polysaccharides such as starch. It is particularly effective with the mono- and di-saccharides which have a sweet taste per se, such a material being herein called "a sweet fermentable sugar." It is preferred to employ the active ingredients with refined carbohydrates and the like of the character indicated which are commonly employed as added ingredients usually for a sweetening effect in food preparations or manufacture. Such "refined sweet fermentable sugars" illustratively are refined sugar or sucrose, brown sugar, dextrose, invert sugar sirup, corn sugar or sirup, maple sirup or sugar, honey, etc.

As indicated, the invention is particularly applicable to certain food products which possess usually a proportionate share of fermentable carbohydrates. These materials are further characterized by a ready or appreciable tendency of the fermentable carbohydrates to break down to form acids in the oral cavity. It will generally be found to contain a least a few percent of such fermentable carbohydrates, such as about five percent based on the weight of total solids. Among food products are suitable milk or dairy products, bakery goods, confectionery, beverages, fruit products, etc. Such products may be solid, semi-solid or liquid in form and may be dried, frozen, canned, preserved, etc. according to usual practice.

The effectiveness of the invention may be readily illustrated with certain suitable food products. The table below sets forth the average results obtained on a number of subjects by taking the pH of the tooth surface before and after ingestion of certain foods containing the indicated amount of sodium N-lauroyl sarcoside as an active ingredient, and recording the lowest pH level and average pH drop as indicative of acid production, in comparison to the results obtained using the food alone as a control. The foods were:

(a) A 50% glucose solution, and dissolving the active ingredient in certain samples, (b) a frozen ice-cream type dessert prepared from a commercial retail powdered mix containing cane and corn sugars, non-fat milk solids, caboxymethylcellulose stabilizer, egg yolk solids and flavor and color by mixing the same with a suitable amount of milk, freezing, whipping the mixture again to increase the volume until it is creamy and refreezing; the active ingredient being added during the initial mixing, (c) cup cakes prepared from a retail white cake mix containing sugar, cake flour, shortening, baking powder, salt and flavor by beating with milk (the active ingredient was added to the milk), and baking the resulting batter at about 375° F., and, (d) fudge prepared from a retail fudge mix which was cooked with water to the desired consistency, the active ingredient being dissolved in the water in certain samples also.

TABLE
TOOTH SURFACE—AVERAGE pH VALUES

| Food | Food Alone | | Food with Active Ingredient | | |
| --- | --- | --- | --- | --- | --- |
| | Min. pH (after ingestion) | pH drop (after ingestion) | Min. pH (after ingestion) | pH drop (after ingestion) | Percent Active Ingredient |
| 50% glucose solution | 5.1 | 1.1 | 6.1 | 0 | 0.2 |
| Ice cream | 5.3 | 1.0 | 5.9 | 0.3 | 0.1 |
| Cake | 5.2 | 1.0 | 5.4 | 0.6 | 0.1 |
| Do | 5.2 | 0.9 | 5.6 | 0.3 | 0.5 |
| Fudge | 5.4 | 0.8 | 5.8 | 0.2 | 0.1 |

It will be evident from the table that the food containing the active ingredient was effective in inhibiting acid production in the oral cavity following the ingestion of the particular food. It is to be noted that the average pH drop was substantially less using the food containing the active ingredient in comparison to the effects produced by the food alone. Furthermore, the minimum pH encountered using the food containing the active ingredient was substantially higher compared to the control food samples.

Thus, the invention is particularly applicable to frozen confections, such as ice cream and the like. A frozen dairy confection such as ice cream usually contains fat, milk solids, and one or more sweetening sugars. Ice cream is usually made by the admixture of cream and milk to give the desired butter fat content though other suitable fat may be used, a sugar such as refined cane sugar as such or possibly in the form of sweetened condensed milk, and the solids-non-fat being made up usually from the non-fat portion of the cream, or suitable milk product such as whole milk or condensed skim milk. It may also contain such optional ingredients as natural or artificial food flavors, chocolate or cocoa, properly prepared fruit or juice thereof, nuts, malted milk, confectionery, suitable alcoholic beverages, etc. Egg solids may also be added usually in minor amounts. Various other ingredients such as gelatin, egg white, algin, gum acacia, gum karaya, gum tragacanth, agar agar, may also be added in very small amounts usually. It is also common to use other suitable stabilizers such as mono- and diglycerides of fatty acids, carboxymethylcellulose, e. g., up to 0.5%. The approximate composition of ice cream is of the order of about 8 to 20% fat (usually 10 to 14%), about 6 to 14% milk solids non-fat (usually 9 to 11%), and cane sugar or the like from about 13 to 17% (usually 14 to 16%), though greater or lesser quantities of each may be used provided the essential character of the food is preserved. In actual practice, after the liquid ingredients have been mixed and heated, the dry ingredients are added thereto such as sugar, stabilizer, etc. and the materials are heated and stirred together to obtain the proper consisency. In commercial practice, such a mix is usually heated until the desired pasteurization conditions are reached, which may correspond for example to about 150° F. for about thirty minutes. If desired, the ice cream mix may be homogenized to obtain the proper smoothness and degree of dispersion of the fat. After cooling, the ice cream mix is eventually frozen in a freezer with agitation to incorporate air and increase the volume of the mix to the desired swell or over-run. Refrigeration is usually continued until the mass is hard and freezing is completed to the extent of producing the desired plasticity characteristic of ice cream.

The active ingredients of the present invention may be suitably dispersed or dissolved in such products without adversely affecting the same at any stage during the manufacture. The amide products may be added either before or after pasteurization, homogenization, or freezing provided a homogeneous mass is obtained. It is preferred to add the amide either in solution form or in form of a powder with agitation either to the liquid or solid ingredients or to the mix before homogenization and freezing in order to adequately disperse the amide throughout the mix and obtain a smooth, homogeneous product.

There are additional varieties of frozen dairy products which comprise milk solids, fats, and sugars, and are distinguished by their variance in specific composition, but are equally applicable herein. Such products are mousse, parfait, puddings, frozen custard, etc.

Other suitable products which contain milk solids and suitable sugars are milk sherbert and similar dessert mixes, the milk constituent solids if any usually being less than ice cream. Water ices may also be used since such frozen confections comprise largely a suitable fruit ingredient with or without added water and sweetened usually with one or more ingredients such as sugar, dextrose, corn sirup, the constituents being frozen while being stirred usually.

The present invention is also applicable to sugared fruit products such as preserves, jellies, jams, marmalades, sirups, etc. Such products are usually made by cooking to a suitable consistency fruit and sugar, the sugar usually being sucrose, dextrose, or corn sugar. Such products as preserves and jams generally contain approximately equal amounts of fruit and sugar and usually at least about 45 lbs. of fruit to each 55 lbs. of sugar, such products differing essentially in the physical condition of the fruit in the finished product, since in preserves it is present in more or less whole pieces, whereas the fruit is macerated or disintegrated in jams. In the usual manufacture, the prepared fruit is cooked until the desired consistency is reached. While the active ingredients of the present invention may be added at any suitable stage in the manufacture, it is preferred that the product be added to the liquid preserves or the like and suitably dispersed therein after cooking and before the same are poured into suitable containers. The desired amide products may also be added to jellies which are essentially semi-solid gelatinous-like products made by cooking to a suitable consistency a water extract of fruit with sugar, such as sucrose and/or dextrose. Marmalades are also suitable since such products are essentially preserves or jellies containing thinly sliced skin.

The invention is further applicable to foods commonly and usually known as "sweet chocolate" and chocolate-containing products such as coatings for ice cream, sweet confections, bakery products, and the like. Such products are usually composed basically of chocolate or chocolate liquor intimately mixed or ground with one or more sugar sweetening ingredients. Sweet, bittersweet chocolate, etc. generally contains not less than 15% by weight of chocolate. The sweetening ingredient traditionally used in sweet chocolate and the like is sucrose, though anhydrous dextrose or dried corn sirup is also used though in a limited quantity in combination. The percentage of chocolate liquor in most sweet chocolate is usually too small to supply a sufficient quantity of fat to impart the plasticity or viscosity usually desired when the chocolate is to be used for heating or coating, and therefore suitable fatty materials such as cacao fat, vegetable oils and fats, etc. may be added if desired. Emulsifying ingredients such as lecithin, mono- and diglycerides of fatty acids, monosodium phosphate derivatives, etc., may also be added in minor amounts such as up to about 0.5%, and also milk solids to form such products as milk chocolate and the like. The active ingredients may be added thereto in any suitable stage to obtain proper homogeneity.

The active ingredients of the present invention may also be employed in candy and other similar confectionery. A great diversity of materials is ordinarily employed in the manufacture of candy, among the chief of which are such sugars as sugar, corn sirup, molasses, etc., usually in combination with various fruits, nuts, gums, chocolate, etc. The active ingredients may be used with stick or hard candy and the like, molasses taffy and the like, sugar coated products such as almonds, jelly beans, gum drops, and also chocolate-dipped or treated products, creams, caramels, lifesavers, marshmallows, fudges, icings, candied fruit, etc. For example, an embodiment thereof relates to a confection containing a gum base, a substantial amount of a sweet fermentable sugar, and a minor amount of an N-higher fatty acyl sarcoside compound having about 12 to 16 carbon atoms in the acyl group, as illustrated by the gum products of Example VIII hereinafter set forth. The active ingredient is preferably added such that it is in intimate admixture with the sugar usually. It may be cooked with the sugars, or in the case of coated, dusted, or dipped products, applied either separately or in combination with the sugar, depending upon the mode of manufacture of the particular candy.

The invention is also applicable to carbonated waters, beverages and the like which comprises a suitable diluent such as water, carbon dioxide under pressure, flavoring sirups, and sugars. Such drinks as various "cola" drinks and similar carbonated beverages containing flavoring constituents and the like are also suitable. Suitable active ingredients may be added thereto and dissolved or otherwise dispersed throughout the liquid.

The invention is also applicable as indicated to bakery type products, and other prepared flour compositions which will produce cakes, crackers, biscuits, rolls, bread, Boston brown bread, waffles, etc. Although bread is basically made from flour, water, salt and leavening agent, e. g., yeast, baking powder, commercial practice has introduced other optional ingredients to improve food value, flavor, appearance, etc. Chief among these are malt sirup, salts, sugar, shortening and milk products. The sugar is usually added to supplement the sugar formed by the action of diastase on starch, furnishes more gas for raising the dough, adds flavor, etc. Malt sirup supplies malt sugar and enzymes to convert starch to sugar and dextrose, etc., and the yeast ferments carbohydrates and produces gas which raises the dough. The dough is then baked, the temperature of the oven being usually about 400° F., but the interior of the loaf usually does not reach a temperature much above 212° F. A typical dough contains: 200 lb. flour, 124 lb. water, 4 lb. yeast, 8 oz. yeast food, 4 lb. salt, 10 lb. sugar, 6 lb. shortening, 8 lb. malt. The active ingredient may be appropriately added to the batter which is baked subsequently.

Sweet baked goods are prepared from flour and a suitable sweet fermentable sugar in sufficient amount to give the desired taste, such as various cakes, pastry, etc. The batter is prepared in the usual manner and baked to desired texture. The active ingredients are incorporated as previously indicated. Bakery products having icing or cream or custard filled products are also included herein. For such sweet baked goods as cup-cakes, angel food cake, white cake, sugar cookies, it is also common to use a prepared cake flour or mix containing added amounts of sugar, flavor, baking powder, etc. It is within the scope of this invention that such powdered mixes and the like may contain a suitable amount of active ingredient also.

The invention is also applicable to fruit juices, particularly those having an added small proportion of a sweetening sugar. Such juices are essentially the express juices of ripe fruits which are suitably bottled, canned, or otherwise prepared for sale. Among such juices are grape, lime, apple, and pineapple juice. If a considerable proportion of sugar is used, the product attains usually the consistency of the character of fruit sirups, with which the active ingredients may also be admixed.

The invention is also applicable to suitable canned, bottled, frozen or otherwise preserved foods such as fruits and their extracts or juices, vegetables, etc., particularly those containing sugar sirups and the like wherein the sugar is added to give desirable seasoning, preserve color, and for other advantages. The amide products are preferably added such that they are dissolved or in suspension in the liquid phase of the foods before closure and final heat processings, if any. Such canned foods for example are generally prepared by filling the can with the desired ingredients, exhausting air and any other gas from the product, usually by passing the same through a blanket of steam and sealing the can, insuring a satisfactory degree of reduced pressure therein. Thereafter the cans are subjected to heat processing treatments to prevent spoilage by micro-organisms, such as by sterilization. The processing times and temperatures vary with the nature of the food itself, the types of organisms which are associated with its spoilage, and other factors, such practices being well known in the canning art. Canned fruit cocktail, for example, contains in desired sizes such fruit ingredients as peach, pear, grape, pineapple, cherry, etc. Such canned fruits generally have a liquid packing medium, usually of sirups of desired sweetness and density. The packing media may be the juices of the fruits per se, water, or sirups containing sugar or equivalent sweetening agent such as dextrose, corn sugar, etc. The active ingredients may be incorporated preferably in such media. Commercially prepared frozen fruits often consist of one or more fruit ingredients to which sugar or a mixture of sugar or other sweetening ingredients has been added in either dried or liquid form. The added sweetening material or packing medium may similarly contain active ingredients.

The following formulations are additionally illustrative of the present invention, the food in each case being prepared in the usual manner:

EXAMPLE I—ICE CREAM

| Composition: | Percent |
| --- | --- |
| Butterfat | 12–13 |
| Serum (non-fat) solids | 10–11 |
| Sugar | 14.5–15 |
| Stabilizer | 0.15–0.5 |
| Sodium N-lauroyl sarcoside | 0.1–0.2 |

EXAMPLE II—ANGEL FOOD CAKE

| Composition: | Percent of batter |
| --- | --- |
| Flour | 14.5 |
| Sugar | 42.0 |
| Egg whites | 42.0 |
| Salt | 0.5 |
| Cream of tartar | 0.5 |
| Potassium N-lauroyl sarcoside | 0.5 |

EXAMPLE III—CHOCOLATE PUDDING

| Composition: | Percent |
| --- | --- |
| Corn starch | 23 |
| Tapioca starch | 9 |
| Cocoa powder | 17–18 |
| Cane sugar | 50 |
| Flavor | As desired |
| Sodium N-lauroyl sarcoside | .1–1 |

EXAMPLE IV—ICING

| Composition: | | |
| --- | --- | --- |
| Water | ounce | 16 |
| Glucose | do | 4 |
| Sugar | do | 112 |
| Vanilla | do | ½ |
| Egg whites | do | 3 |
| Sodium N-lauroyl sarcoside | percent weight | .1–1 |

EXAMPLE V—CHOCOLATE FUDGE

Composition:
- Chocolate _____ ounce__ 6
- Butter _____ do____ ⅓
- Sugar _____ pound__ 2
- Milk _____ do____ 1
- Vanilla _____ ounce__ ⅟₁₆
- Sodium N-myristoyl sarcoside__percent weight__ .1–.5

EXAMPLE VI—JELLIED FRUIT CANDIES

Composition:
- Plum pulp _____ pound__ 20
- Peach pulp _____ do____ 20
- Cane sugar _____ do____ 22
- Corn sirup _____ do____ 20
- Powdered pectin _____ do____ 1
- Water _____ gallon__ 2
- Sodium N-lauroyl glycide____percent weight__ .1–1

EXAMPLE VII—KOLA BEVERAGE SYRUP

Composition:
- Fluid extract of Coca _____ fluid ounce__ 4
- Fluid extract of Kola _____ do____ 2
- Lime juice _____ pints__ 1½
- Ginger ale extract _____ fluid ounce__ ¾
- Sugar _____ pounds__ 6
- Water _____ pints__ 3
- Flavoring material _____ As desired
- Sodium N-lauroyl sarcoside__percent weight__ .1–1

EXAMPLE VIII—GUM DROPS

Composition:
- Gum arabic _____ parts__ 40
- Glucose _____ do____ 7
- Sugar _____ do____ 28
- Color _____ As desired
- Sodium N-lauroyl sarcoside__percent weight__ .1–1

EXAMPLE IX—SUGAR SYRUP

Composition:
- Granulated sugar _____ pounds__ 6
- Corn sirup _____ do____ ½
- Water _____ quart__ 1
- Sodium N-lauroyl glycide____percent weight__ .5–1

EXAMPLE X—FRUIT JELLY

Composition:
- Liquid pectin _____ gallon__ 50
- Cane sugar _____ pounds__ 600
- Fruit juice _____ gallon__ 9
- Sodium N-lauroyl sarcoside___percent weight__ .5

Although the present invention has been described with reference to particular embodiments and examples, it will be apparent to those skilled in the art that variations and modifications of this invention can be made and that equivalents can be substituted therefor without departing from the principles and true spirit of the invention.

Having described the invention, what is desired to be secured by Letters Patent is:

1. An improved food preparation comprising a fermentable carbohydrate food in an amount normally tending to produce acid therefrom in the oral cavity and having incorporated therein a minor amount of a higher fatty acid amide of an amino carboxylic compound to inhibit acid production from said fermentable carbohydrate.

2. A food preparation having an added sweet fermentable sugar content normally tending to produce acid therefrom in the oral cavity and a minor amount of an N-higher fatty acyl amino substituted lower alkane carboxylic compound, the fatty acyl radical thereof having from about 12 to about 16 carbon atoms.

3. A food composition having an added refined sweet fermentable sugar content normally tending to produce acid therefrom in the oral cavity containing a minor amount of a compound having the formula:

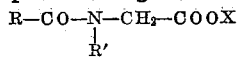

wherein RCO— is a saturated fatty acyl radical of about 12 to 16 carbon atoms, R' is selected from the group consisting of hydrogen and lower alkyl, and X is selected from the group consisting of hydrogen and water soluble salt-forming cations.

4. A food preparation in accordance with claim 3 wherein the sweet fermentable sugar is sucrose.

5. A food preparation in accordance with claim 3 wherein the sweet fermentable sugar is a monosaccharide.

6. A food preparation in accordance with claim 3 wherein the fatty acyl radical of said compound is dodecanoyl.

7. A food preparation in accordance with claim 3 wherein R' is a methyl group.

8. A frozen confection containing a fermentable carbohydrate normally tending to produce acid therefrom in the oral cavity and a minor amount of a higher fatty acid amide of an amino carboxylic acid compound.

9. Ice cream containing a sweet fermentable sugar normally tending to produce acid therefrom in the oral cavity, and a minor amount of a higher fatty acid amide of a lower aliphatic amino monocarboxylic acid compound, the fatty acyl radical thereof having from about 12 to about 16 carbon atoms.

10. A fruit product containing a fermentable carbohydrate normally tending to produce acid therefrom in the oral cavity and a minor amount of a higher fatty acid amide of an amino monocarboxylic acid compound.

11. A cooked fruit product containing a sweet fermentable carbohydrate normally tending to produce acid therefrom in the oral cavity and a minor amount of a higher fatty acid amide of an amino monocarboxylic acid compound, the fatty acyl radical thereof having from about 12 to about 16 carbon atoms.

12. A chocolate-containing product containing a sweet fermentable sugar normally tending to produce acid therefrom in the oral cavity and a minor amount of a higher fatty acid amide of an amino carboxylic acid compound.

13. A confection containing a sweet fermentable sugar normally tending to produce acid therefrom in the oral cavity and a minor amount of a higher fatty acid amide of an amino monocarboxylic acid compound, the fatty acyl radical thereof having from about 12 to about 16 carbon atoms.

14. A beverage containing a fermentable carbohydrate normally tending to produce acid therefrom in the oral cavity and a minor amount of a higher fatty acid amide of an amino carboxylic acid compound.

15. A carbonated beverage containing a sweet fermentable sugar normally tending to produce acid therefrom in the oral cavity and a minor amount of a higher fatty acid amide of an amino monocarboxylic acid compound, the fatty acyl radical thereof having from about 12 to about 16 carbon atoms.

16. A bakery product comprising a fermentable carbohydrate normally tending to produce acid therefrom in the oral cavity and a minor amount of a higher fatty acid amide of an amino carboxylic acid compound.

17. Sweet baked goods comprising a sweet fermentable sugar normally tending to produce acid therefrom in the oral cavity and a minor amount of a higher fatty acid amide of an amino monocarboxylic acid compound, said fatty acyl radical containing from about 12 to about 16 carbon atoms.

18. A preserved food containing a fermentable carbohydrate normally tending to produce acid therefrom in the oral cavity and a minor amount of a higher fatty acid amide of an amino carboxylic acid compound.

19. A food composition comprising a sweet fermentable sugar content normally tending to produce acid therefrom in the oral cavity, and in minor proportion to said fermentable sugar content and up to about one percent by weight of an amide compound having the formula:

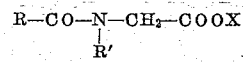

wherein RCO— is a saturated fatty acyl radical of about 12 to 16 carbon atoms, R' is selected from the group consisting of hydrogen and lower alkyl, and X is selected from the group consisting of hydrogen and water soluble salt-forming cations.

20. A food composition in accordance with claim 19 wherein the amide compound is sodium lauroyl sarcoside.

21. A food composition comprising a fermentable sugar content normally tending to produce acid therefrom in the oral cavity, and a minor amount of an N-higher fatty acyl sarcosine compound.

22. A food composition comprising a fermentable sugar content normally tending to produce acid therefrom in the oral cavity, and a minor amount of an N-higher fatty acyl glycine compound.

23. A food composition comprising a fermentable sugar content normally tending to produce acid therefrom in the oral cavity, and a minor amount of a water-soluble N-lauroyl sarcosine compound.

24. A process which comprises admixing a fermentable carbohydrate food normally tending to produce acid therefrom in the oral cavity with a minor amount of a higher aliphatic acyl amide of an amino carboxylic compound.

25. A process which comprises incorporating a minor amount of a material selected from the group consisting of lauroyl, myristoyl and palmitoyl sarcosides in a food preparation having a sweet fermentable carbohydrate content normally tending to produce acid therefrom in the oral cavity.

26. A confection containing a gum base, a substantial amount of a sweet fermentable sugar, and a minor amount of an N-higher fatty acyl sarcoside compound having about 12 to 16 carbons in the acyl group.

27. A confection in accordance with claim 26 which contains sodium N-lauroyl sarcoside.

References Cited in the file of this patent

UNITED STATES PATENTS

| | | |
|---|---|---|
| 1,917,258 | Harris | July 11, 1933 |
| 2,105,701 | Ramage | Jan. 18, 1938 |
| 2,384,818 | Curme | Sept. 18, 1945 |
| 2,428,353 | Bersworth | Oct. 7, 1947 |
| 2,461,519 | Bersworth | Feb. 15, 1949 |
| 2,500,019 | Bersworth | Mar. 7, 1950 |

FOREIGN PATENTS

| | | |
|---|---|---|
| 675,837 | Germany | Apr. 27, 1939 |
| 729,572 | Germany | May 19, 1940 |

OTHER REFERENCES

Technical Bulletin No. 1 of the Bersworth Chemical Co., Framington, Mass., copyright Jan. 14, 1949, date obtained from the Library of Congress, pages 1 to 5, 7 and 22.